United States Patent [19]

Sandhu et al.

[11] 4,140,644
[45] Feb. 20, 1979

[54] POLYESTER TONER COMPOSITIONS

[75] Inventors: M. Akram Sandhu, Webster; John F. Wright, Rochester, both of N.Y.

[73] Assignee: Eastman Kodak Company, Rochester, N.Y.

[21] Appl. No.: 821,424

[22] Filed: Aug. 3, 1977

[51] Int. Cl.$^2$ .............................................. G03G 9/10
[52] U.S. Cl. ............................... 252/62.1 P; 96/1 SD; 528/272
[58] Field of Search ............. 252/62.1 P, 62.1 R; 96/1 SD; 260/75 R

[56] References Cited

U.S. PATENT DOCUMENTS

| | | | |
|---|---|---|---|
| 2,986,521 | 5/1961 | Wielicki | 252/62.1 P |
| 3,054,703 | 9/1962 | Brasure | 260/75 R |
| 3,057,824 | 10/1962 | LeBras et al. | 260/75 R |
| 3,254,055 | 5/1966 | Smith | 260/75 R |
| 3,647,696 | 3/1972 | Olson | 252/62.1 P |
| 3,910,846 | 10/1975 | Azar et al. | 252/62.1 P |
| 3,985,559 | 10/1976 | Peters | 252/62.1 P |
| 3,998,747 | 12/1976 | Yamikami et al. | 252/62.1 P |
| 4,012,363 | 3/1971 | Bruning | 252/62.1 P |
| 4,049,447 | 9/1977 | Azar et al. | 252/62.1 P |

*Primary Examiner*—John D. Welsh
*Attorney, Agent, or Firm*—William T. French

[57] ABSTRACT

An electrographic toner composition comprises a polyester resin that is the condensation product of from about 30 to about 100 mole percent 2,2-dimethyl-1,3-propanediol, from 0 to about 70 mole percent 2,2'-oxydiethanol and terephthalic acid or any ester forming derivative thereof, the polyester resin having an inherent viscosity of at least about 0.30.

14 Claims, No Drawings

POLYESTER TONER COMPOSITIONS

FIELD OF THE INVENTION

This invention relates to electrography, to electrographic developers, and in particular, to polyester resins for improved dry electrographic toners.

BACKGROUND OF THE INVENTION

Electrographic impaging and developing processes, for example electrophotographic imaging process and techniques, have been extensively described in both the patent and other literature, for example. U.S. Pat. Nos. 2,221,776, issued Nov. 19, 1940; 2,277,013, issued Mar. 17, 1942; 2,297,691, issued Oct. 6, 1942; 2,357,809, issued Sept. 12, 1944; 2,551,582, issued May 8, 1951; 2,825,814, issued Mar. 4, 1958; 2,833,648, issued May 6, 1958; 3,220,324, issued Nov. 30, 1965; 3,220,831, issued Nov. 30, 1965; 3,220,833, issued Nov. 30, 1965; and many others. Generally these processes have in common the steps of forming a latent electrostatic charge image on an insulating electrographic element. The electrostatic latent image is then rendered visible by treatment with an electrostatic developing composition or developer.

Conventional developers include a carrier that can be either a triboelectrically chargeable, magnetic material such as iron filings, powdered iron or iron oxide, or a triboelectrically chargeable, non-magnetic substance like glass beads or crystals of inorganic salts such as sodium or potassium chloride. In addition to the carrier, electrostatic developers include a toner which is electrostatically attractable to the carrier. The toner is usually a particulate polymeric material which may, if desired, be suitably darkened or colored for image viewing purposes with a colorant such as dyestuffs or pigments, for example, carbon black.

To develop an electrostatic image, the dry developer can be applied imagewise to the electrostatically charged surface by various techniques. One such technique is known as cascade development and is described in U.S. Pat. No. 2,618,552, issued Nov. 18, 1952.

Another suitable developing technique is known as magnetic brush development and is described in U.S. Pat. No. 3,003,462, issued Oct. 10, 1961.

In conventional electrophotographic applications, the developed image is formed on a photoconductive element and is transferred to a receiving sheet. The image thus transferred is then fixed, i.e., made permanent typically by heating to fuse the transferred image. Thus, the toner material must be capable of being fused under temperature conditions which will avoid any charring, burning or other physical damage to the receiver sheet which is typically formed of paper.

A variety of processes and apparatus have been described in the electrographic art for accomplishing fixing of the transferred image. Typically this is accomplished by the combined application of heat and pressure, for example, by bringing the receiving sheet containing the transferred developed toner image into contact with a heated fusing roller. In addition to the use of a heated fusing roller other devices may be utilized for the fixing of the developed toner image such as contacting the developed toner image with a heated platen or some other similar heated member.

The property of a toner to fuse adequately at a low temperature is quite important. This property, described herein by a low "onset of fusing" temperature, allows operation at lower temperature, thus consuming less energy and increasing machine life by reducing the degradation effects of heat on elastomeric fusing roller materials, electronic components, and the like; and further allows higher-speed machine operation.

However, regardless of the type of heated fusing member employed, it has been recognized in the electrographic art that there exists a substantial problem associated with the "off-setting" of individual toner particles of the developed image during the fixing operation. Off-setting is the undesirable transfer of toner particles from the developed toner image carried on a receiving member (e.g., copy sheet) to the surface of the heated fusing member. The surface of the fusing member therefore becomes contaminated with toner particles; and, upon further use of such a contaminated fusing member, it is found that these toner particles adhered to the surface of the fusing member are transferred to subsequent copy sheets or receiving members. As a result, either a ghost image of previously fixed images is formed on subsequent copy sheets, or undesirable deposits of toner material are formed in background areas of subsequent copy sheets, i.e., scumming or discoloration occurs in background areas of subsequent copies.

Thus, a high "hot offset" temperature, i.e., the temperature at which the cohesive strength of the toner matrix material (or binder resin) is lost and the toner thus sticks to the fusing roller and causes offset, is also desirable for a toner. The difference between the "onset of fusing" temperature and the "hot offset" temperature is referred to herein as "offset latitude". The greater the offset latitude is, the wider the temperature range in which the fusing roller can operate.

Although polyester resins have been broadly suggested for use as a matrix material or binder for electrographic toners, it appears that few specific polyester compositions have been described for use in electrographic toners. For instance, U.S. Pat. No. 3,647,696 suggests that polyester condensates like poly(ethylene-co-2,2-dimethyl-1,3-propylene terephthalate-coisophthalate) are useful as binder resins for electrographic toners.

It has generally been difficult to obtain a polyester toner composition that has both a low "onset of fusing" temperature and a high "hot offset" temperature, in other words a wide "offset latitude". One method for accomplishing this desired result is to crosslink the polyester resins as described in U.S. Pat. No. 3,938,992. Crosslinking however can be difficult to control and can introduce other manufacturing problems such as, for instance, difficulty in grinding toner powders, or difficulty in dissolving polyester toner compositions for spray drying, etc. Thus, it would be desirable to obtain a polyester toner composition having the above-described desirable fusing properties without requiring a crosslinked polyester resin.

SUMMARY OF THE INVENTION

The present invention provides a polyester toner composition having a relatively wide offset latitude. The electrographic toner composition comprises a polyester resin that is the condensation product of from about 30 to about 100 mole percent 2,2-dimethyl-1,3-propanediol, from 0 to about 70 mole percent 2,2'-oxydiethanol and terephthalic acid or any ester forming derivative thereof, the polyester resin having an inherent viscosity of at least about 0.30.

The polyester toner composition described above is particularly useful in any imaging process wherein a visible image is formed by depositing toner in an imagewise fashion on a substrate and the visible image is made permanent by fixing the toner image to the substrate by heated-roller fusing. Such images can be formed by a variety of processes, including, for example, electrophotography, electrostatography, photoelectrophoretic migration imaging, magnetic image formation, and the like.

DETAILED DESCRIPTION OF THE INVENTION

In accord with the present invention, an electrographic toner comprises a polyester resin that is the condensation product of from about 30 to 100 mole percent 2,2-dimethyl-1,3-propanediol, from 0 to about 70 mole percent 2,2'-oxydiethanol, and terephthalic acid or any ester forming equivalent thereof. For example, the diester and the diacid halide of terephthalic acid are equivalent to terephthalic acid for purpose of this invention. In fact, the dimethyl ester of terephthalic acid is preferred for the practice of this invention.

The polyester resins useful in the present invention can generally be represented by the following formula:

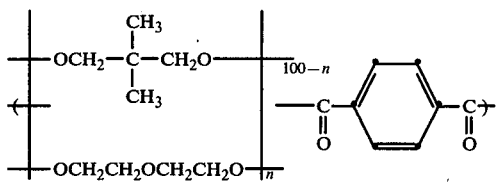

wherein n is 0 to about 70. In the formula above, n refers to the mole percent of the glycol derivative units in the polyester that are derived from 2,2'-oxydiethanol. Polyester resins in which n is from about 15 to about 70 are preferred because the "onset of fusing" temperature of such resins is generally less than about 150° C. Polyester resins having n in the range of from about 15 to about 50 are even more preferred because such resins evidence extremely good storage stability in addition to having the other desirable properties described above. By storage stability, as used herein, we mean that the toner particles of this invention remain a free-flowing powder even after incubation at 50–60° C. for up to 48 hours.

The polyester resins of this invention generally have a glass transition temperature $T_g$ in the range of from about 40° C. to about 80° C. The preferred polyester resins have a $T_g$ in the range of from about 55° C. to about 80° C. because they exhibit better storage stability. The storage stability of toner compositions comprising polyester resins, particularly those having a $T_g$ from about 40° C. to about 55° C., can be enhanced by blending the toner particles with a "nonblocking agent". A "nonblocking agent" as used herein refers to a material that prevents clumping or caking of toner particles during storage.

A particularly useful nonblocking agent is polystyrene powder. Storage stability is evaluated by incubating the ground toner particles at a preselected temperature for a desired time period and then pouring to determine whether the particles are free-flowing. The amount of nonblocking agent required to effect the desired storage stability can be easily determined by such evaluation.

The polyester resins useful in this invention can be made by a conventional two-stage polyesterification reaction comprising the steps of:

1. Heating the glycols and diacid ester in the presence of a catalyst, such as a mixture of zinc acetate dihydrate and antimony trioxide, in an inert atmosphere at about 190°–280° C. (preferably about 200–260° C.);
2. Applying vacuum at the upper temperature range (260–280° C. preferably) and continuing to heat under vacuum to build up the molecular weight; and
3. Cooling and isolating the product.

The degree of polymerization is monitored by determining the inherent viscosity of samples taken at periodic intervals. Polyester resins useful in the present invention generally have an inherent viscosity of at least about 0.30, preferably in the range of from about 0.30 to about 0.85, and even more preferably in the range of from about 0.40 to about 0.70. For each mole of dimethyl terephthalate used in the feed stream for a given polymerization, when the desired fraction of oxydiethylene units in the final polymer is X, the amount "A" of 2,2'-oxydiethanol used in the feed for the reaction is given by the equation:

$$A = 1.53 \text{ X mole}$$

and the amount "B" of 2,2-dimethyl-1,3-propanediol used in the feed is given by the equation:

$$B = 1.36 (1-X) \text{ mole}.$$

The toner particles of the present invention can be prepared by various methods, such as melt-blending, etc. Particles having an average diameter between about 0.1 micron and about 100 microns may be used, although present day office copy devices typically employ particles having an average diameter between about 1.0 and 30 microns. However, larger particles or smaller particles can be used where desired for particular methods of development or particular development conditions. For example, in powder cloud development such as described in U.S. Pat. No. 2,691,345, issued Oct. 12, 1954, extremely small toner particles on the order of about 0.01 microns may be used.

The above-noted melt-blending method for preparing the toner composition of the present invention involves melting a powdered form of binder polymer and mixing it with other necessary or desirable addenda including colorants such as dyes or pigments. The polymer can readily be melted on heated compounding rolls which are also useful to stir or otherwise blend the polymer and addenda so as to promote the complete intermixing of these various ingredients. After thorough blending, the mixture is cooled and solidified. The resultant solid mass is then broken into small particles and finely ground to form a free-flowing powder of toner particles having the desired size.

A variety of colorant materials selected from dyestuffs and/or pigments are advantageously employed in the toner materials of the present invention. Such materials serve to color the toner and/or render it more visible. Of course, suitable toner materials having the appropriate charging characteristics can be prepared without the use of a colorant material where it is desired to have a developed image of low optical capacity. In those instances where it is desired to utilize a colorant, the colorants used, can, in principle, be selected from virtually any of the compounds mentioned in the Colour Index, Volumes 1 and 2, Second Edition.

Included among the vast number of useful colorants would be such materials as Hansa Yellow G (C.I. 11680), Nigrosine Spirit soluble (C.I. 50415) Chromogen Black ETOO (C.I. 45170), Solvent Black 3 (C.I. 26150), Fuchsine N (C.I. 42510), C.I. Basic Blue 9 (C.I. 52015), etc. Carbon black provides a particularly useful colorant. The amount of colorant added may vary over a wide range, for example, from about 1 to about 20 percent of the weight of the polyester binder. Particularly good results are obtained when the amount is from about 2 to about 10 percent. In certain instances, it may be desirable to omit the colorant, in which case the lower limit of concentration would be zero.

Other modifying materials such as various long chain anionic or cationic surfactants, conductive materials, and magnetic materials may also be incorporated, if desired, in the toner particles of the invention. Still other toner additives which may be incorporated in the toner particles are materials such as those described in Jacknow et al. U.S. Pat. No. 3,577,345, issued May 4, 1971. Generally, if any of the various modifying materials described above are used in the toner particles of the invention, the total amount thereof (excluding the weight of colorants) should be less than about 30 weight percent of the total weight of the toner particle.

The toners of this invention can be mixed with a carrier vehicle to form developing compositions. The carrier vehicles which can be used with the present toners to form new developer compositions can be selected from a variety of materials. Suitable carrier vehicles useful in the invention include various non-magnetic particles such as glass beads, crystals of inorganic salts such as sodium or potassium chloride, hard resin particles, metal particles, etc. In addition, magnetic carrier particles can be used in accordance with the invention. Suitable magnetic carrier particles are particles of ferromagnetic materials such as iron, cobalt, nickel, and alloys and mixtures thereof. Other useful magnetic carriers are ferromagnetic particles overcoated with a thin layer of various film-forming resins, for example, the alkali-soluble carboxylated polymers described in Miller, U.S. Pat. No. 3,547,822, issued Dec. 15, 1970; Miller, U.S. Pat. No. 3,632,512, issued Jan. 4, 1972; McCabe, U.S. Pat. No. 3,795,617, issued Mar. 5, 1974; Kasper U.S. Pat. No. 3,898,170, issued Aug. 5, 1975; Belgian Pat. No. 797,132, issued Sept. 21, 1973; and Kasper U.S. Pat. No. 3,795,618, issued Mar. 5, 1974. Other useful resin coated magnetic carrier particles include carrier particles coated with various fluorocarbons such as polytetrafluoroethylene, polyvinylidene fluoride, and mixtures thereof including copolymers of vinylidene fluoride and tetrafluoroethylene.

A typical developer composition containing the above-described toner and carrier particles generally comprises from about 1 to about 15 percent by weight of particular toner particles and from about 85 to about 99 percent by weight carrier particles. Typically, the carrier particles are larger than the toner particles. Conventional carrier particles used in cascade or magnetic brush development have an average particle size on the order of from about 30 to about 1200 microns, preferably 60–300 microns.

The above-described toner and developer compositions can be used to develop electrostatic charge patterns. Such developable charge patterns can be prepared by a number of well-known means and be carried, for example, on a light-sensitive photoconductive element or a non-light-sensitive dielectric surfaced receiving element. Suitable dry development processes include cascading a cascade developer composition across the electrostatic charge pattern as described in detail in U.S. Pat. Nos. 2,618,551; 2,618,552; and 2,638,416. Another process involves applying toner particles from a magnetic brush developer composition as described in U.S. Pat. No. 3,003,462. Still another useful development process is powder-cloud development wherein a gaseous medium such as air is utilized as a carrier vehicle to transport the toner particles to the electrostatic charge pattern to be developed. This development process is more fully described in U.S. Pat. No. 2,691,345 and U.S. Pat. No. 2,725,304. Yet another development process is fur brush development wherein the bristles of a brush are used to transport the toner particles to the electrostatic charge pattern to be developed. This development process is more fully described in Walkup, U.S. Pat. No. 3,251,706.

As will be apparent from the above discussion, the improved electrographic development process of the present invention using the toner particles described herein can employ various types of carrier vehicles ranging from the conventional inorganic particles used in cascade development and magnetic particles used in magnetic brush development to gaseous media and fur brushes used in powder cloud and fur brush development, respectively.

After imagewise deposition of the toner particles in accord with the process of the invention, the image can be fused as described earlier herein to adhere it to the substrate bearing the toner image. If desired, the unfused image can be transferred to another support such as a blank sheet of copy paper and then fused to form a permanent image thereon.

The following examples are provided to further demonstrate and to enable a better understanding of this invention. Unless otherwise specified in the examples the following applies:

1. All inherent viscosities $\{\eta\}$ were measured at a concentration of 0.25 g/dl at 25° C. in a 1:1 by weight mixture of phenol:chlorobenzene;
2. the thermal data were measured by differential thermal analysis (DTA) on a DuPont 900 apparatus at a heating rate of 10° C./min with the midpoint of specific heat interval taken as the glass transition temperature ($T_g$); and
3. the nmr spectra were taken on a Perkin-Elmer Model R-32 Spectrometer at 90 MHz in $CDCl_3$, using tetramethylsilane as an internal indicator unless otherwise specified.

EXAMPLE 1 — Preparation of
Poly(2,2-dimethyl-1,3-propylene: 2,2'-oxydiethylene terephthalate)

Preparation A

A mixture of dimethyl terephthalate (97.0 g, 0.5 mole), 2,2'-oxydiethanol (45.6 g, 0.43 mole); 2,2-dimethyl-1,3-propanediol (31.2 g, 0.30 mole); zinc acetate dihydrate (60 mg); and antimony trioxide (20 mg) was heated with stirring under a slow stream of nitrogen at 200° C. for two hours. The temperature was raised to 240° C., and stirring was continued for two hours. The mixture was then stirred at 260° C. for one hour. The polymerization was performed at 280° C./017 mm Hg for 2.5 hours until the stirring was difficult. On cooling under nitrogen, the mixture gave a light-amber, amorphous polymer.

$\{\eta\}$ dl/g = 0.57

$T_g$ ° C. = 42

Composition (by nmr) = 56% 2,2'-oxydiethylene

Preparation B

A mixture of dimethyl terephthalate (97.0 g, 0.5 mole), 2,2'-oxydiethanol (45.6 g, 0.43 mole), 2,2-dimethyl-1,3-propanediol (31.2 g, 0.30 mole), zinc acetate dihydrate (60 mg) and antimony trioxide (20 mg) was heated under a slow stream of nitrogen with stirring at the following temperatures and times:

| Time (min) | Temperature (° C.) | Methanol collected (ml) |
| --- | --- | --- |
| 0 | 205 | 0 |
| 15 | " | Evolution just started |
| 45 | " | 31 |
| 75 | " | 34.8 |
| 105 | " | 35.8 |
| 135 | 245 | 36.8 |
| 165 | " | 38.4 |
| 195 | " | 39.1 |
| 225 | 260 | 39.7 |
| 285 | " | — |

The polymerization was performed by stirring the mixture at 260° C./015mm Hg for 2 hours until stirring was difficult. The progress of the reaction was monitored by measuring the inherent viscosities of the samples taken from the mixture at different intervals.

| Time (min) | $\{\eta\}$ (dl/g) |
| --- | --- |
| 30 | 0.23 |
| 60 | 0.42 |
| 90 | 0.48 |
| 120 | 0.51 |

On cooling under nitrogen, the mixture afforded light-amnber, amorphous polymer.

$\{\eta\}$, dl/g = 0.51

$T_g$ ° C. = 43

Preparation C

A mixture of the same reactants in the same quantities as in the previous experiment was heated under nitrogen as above. The polymerization was done at 270° C./013 mm Hg for 2.5 hours. The inherent viscosities of the samples taken from the mixture at different intervals are as follows:

| Time (min) | $\{\eta\}$ (dl/g) |
| --- | --- |
| 30 | 0.45 |
| 60 | 0.56 |
| 90 | 0.59 |
| 120 | 0.59 |

| Time (min) | $\{\eta\}$ (dl/g) |
| --- | --- |
| 150 | 0.81 |

On cooling under nitrogen, the mixture gave light-amber amorphous polymer.

$\{\eta\}$, dl/g = 0.81

$T_g$ ° C. = 45

Preparation D

A mixture of reactants taken in the same quantities as in Procedure B was heated under the same conditions to perform trans-esterification reaction. The polymerization was done at 280° C./1.00mm Hg for 2.5 hours to give a light amber amorphous polymer. The inherent viscosities of the samples taken at different intervals were as follows:

| Time (min) | $\{\eta\}$ (dl/g) |
| --- | --- |
| 30 | 0.21 |
| 60 | 0.36 |
| 90 | 0.44 |
| 120 | 0.55 |
| 150 (final) | 0.64 |
| $T_g$, ° C. = 45 | |

Preparation E

A mixture of dimethyl terephthalate (97.0 g, 0.5 mole), 2,2;-oxydiethanol (40.5 g, 0.38 mole), 2,2'-dimethyl-1,3-propanediol (35.6 g, 0.34 mole), zinc acetate dihydrate (60 mg) and antimony trioxide (20 mg) was heated under a slow stream of nitrogen. The evolved methanol was collected as follows:

| Time (min) | Temperature (° C.) | Methanol (ml) | |
| --- | --- | --- | --- |
| 65 | 200 | 35 | |
| 240 | 240 | 4 | 39 |
| 285 | 260 | 1.4 | 40.4 |

The polymerization was carried out at 270° C./0.08 mm Hg for 2.5 hours to give light-amber, amorphous polymer. The inherent viscosities of the samples taken from the mixture at different intervals are given.

| Time (min) | $\{\eta\}$ (dl/g) |
| --- | --- |
| 30 | 0.23 |
| 60 | 0.36 |
| 90 | 0.50 |
| 120 | 0.65 |
| 150 (final) | 0.66 |
| $T_g$, ° C. = 45 | |
| Composition (by nmr) = 50% 2,2'-oxydiethylene | |

A series of copolyesters of 2,2'-oxydiethanol and 2,2-dimethyl-1,3-propanediol with terephthalic acid was prepared by using the calculated excess proportion of glycols under the same conditions as given in Preparation E to give the Predicted copolymer compositions listed in Table I.

Table I

Glycol Composition Monomer Feed vs. Polymer Content

| Polymer No. | Feed Glycol Contents for One Mole DMT* | | Copolymer Composition | | |
|---|---|---|---|---|---|
| | 2,2'-Oxydiethanol (mole) | 2,2-Dimethyl-1,3-propanediol (mole) | 2,2'-Oxyethylene (mole) | 2,2-Dimethyl-1,3-propylene (mole) | $\{\eta\}$ (dl/g) |
| 1 | 1.377 | 0.136 | 0.90 | 0.10 | 0.42 |
| 2 | 1.224 | 0.272 | 0.82 | 0.18 | 0.69 |
| 3 | 1.071 | 0.408 | 0.70 | 0/30 | 0.67 |
| 4 | 0.918 | 0.544 | 0.60 | 0.40 | 0.78 |
| 5 | 0.765 | 0.68 | 0.50 | 0.50 | 0.65 |
| 6 | 0.612 | 0.816 | 0.42 | 0.58 | 0.56 |
| 7 | 0.459 | 0.925 | 0.30 | 0.70 | 0.79 |
| 8 | 0.306 | 1.088 | 0.20 | 0.80 | 0.70 |
| 9 | 0.153 | 1.224 | 0.09 | 0.91 | 0.60 |

*DMT = Dimethyl terephthalate.

EXAMPLE 2-32

Polymers of varing composition, inherent viscosities, and $T_g$ were prepared as described herein and evaluated in accordance with the following procedures.

Toner Fabrication by Spray-Dry Procedure

A sample of polymer (7.5 g) was dissolved in 100 g of dichloromethane. To this was added 0.75 g of Regal 300R carbon and 0.075 g. tetrapentylammonium chloride. The carbon was dispersed by sonification with an ultrasonic horn for two minutes. The solution was sprayed into a Niro Nichols spray-dry tower using a Paasche air atomizing nozzle. The resulting powder was classified to obtain a 5- to 15-micron particle-size cut using an Alpine classifier.

Storage Stability Evaluation

About a ¼-inch depth of toner was placed in a 2-dram, glass vial and a 28-g weight was placed on the toner. The system was stored in an oven at 52° C. or 46° C. for 72 hours. After cooling, the ease with which the powder flowed out of the vial and the degree to which it remained a free-flowing powder was then judged as poor, fair, or good.

Roller Fusing Evaluation

Deposits of toner applied to paper by means of a Kleenex tissue or camel hair brush were fixed to the paper by means of a roller fuser. The contact roller fuser consisted of an internally heated compliant fusing roll and a non-compliant pressure roll. The former was covered with about 50 mils of Eccosil 4952 (Emerson-Cuming Co.), the latter with Teflon FEP (DuPont). The two rolls were engaged at a pressure of 15 pounds per linear inch. The surface speed of the rolls was 10 inches per second. A very slight amount of Dow Corning DC 200 fluid (60,000 c) was applied to the fuser roller. Images were fused in this system at varying temperatures to establish the minimum temperature for good fusing and the temperature at which hot offset occurred on the fuser roll. The minimum temperature (onset of good fusing temperature) for good fusing is defined as the temperature at which the crack resulting from folding the paper in the toned area is less than 0.2 mm while the toner is not completely removed from the cracked area.

In addition to the above evaluations, the reflection density of the fused image was measured with a Macbeth RD 100R densitometer.

The results are presented in Table II.

Table II

| Example No. | Mole % Oxydi-ethylene units | $T_g$, ° C. | $\{\eta\}$ (dl/g) | Wt % Charge Agent | Storage Stability at 52° C. | Storage Stability at 46° C. | Onset of Good Fusing, ° F/° C. | Hot Offset, ° F/° C. | Fusing Latitude, ° F/° C. | Average Reflection Density of Fused Toner |
|---|---|---|---|---|---|---|---|---|---|---|
| 2 | 0 | 77 | 0.57 | | Good+ | | 300/149 | 500+/260 | 200/111 | 1.2 |
| 3 | 5 | 72 | 0.51 | | Good | | 325/163 | 500+/260 | 175+/97 | 1.0 |
| 4 | 10 | 71 | 0.60 | | | | 300/149 | 500/260 | 200/111 | 1.2 |
| 5 | 15 | 68 | 0.51 | 1.25 | Good+ | | 275/135 | 500+/26-0+ | 225/125+ | 0.8 |
| 6 | 15 | | | 1.0 | Good | | 300/149 | 500+/26-0+ | 200/111 | 1.3 |
| 7 | 15 | 63 | 0.35 | | Poor | — | 275/135 | 450/232 | 175/97 | 1.15 |
| 8 | 15 | 66 | 0.42 | | Fair+ | — | 275/135 | 475/246 | 200/111 | 1.1 |
| 9 | 15 | 68 | 0.50 | | Good | — | 275/135 | 475/246 | 200/111 | 1.1 |
| 10 | 15 | 67 | 0.59 | | Good+ | — | 300/149 | 500+/26-0+ | 200+/11-1+ | 0.90 |
| 11 | 15 | 68 | 0.67 | | Good+ | — | 300/149 | 500+/26-0+ | 200+/11-1+ | 0.80 |
| 12 | 17.5 | 66 | 0.47 | 1.25 | Good | | 275/135 | 500+/26-0+ | 225+/125 | 0.9 |
| 13 | 17.5 | | | 1.0 | Fair | | 325/163 | 500+/26-0+ | 175/97 | 1.15 |
| 14 | 20 | 65 | 0.57 | | Good− | | 275/135 | 500+/26-0+ | 225+/12-5+ | 1.3 |
| 15 | 20 | 63 | 0.64 | 0.18 | Fair+ | | 275/135 | 475/246 | 200+/111 | 1.2 |
| 16 | 20 | 62 | 0.55 | 0.18 | Fair | | 275/135 | 525/274 | 250/139 | 1.25 |
| 17 | 20 | | 0.44 | 1.0 | Poor− | | 300/149 | 500+/26-0+ | 200/111 | 0.85 |
| 18 | 20 | 61 | 0.48 | 1.25 | Fair | | 250/121 | 500+/26-0+ | 250+/13-9+ | 1.15 |
| 19 | 20 | 58 | 0.64 | 1.0 | | | 250/121 | 500+/26-0+ | 250+/13-9+ | 1.1 |
| 20 | 20 | | 0.41 | 0.12 | | | 250/121 | 500/260 | 250/139 | 1.0 |

Table II-continued

| Example No. | Mole % Oxydiethylene units | $T_g$, °C | {η} (dl/g) | Wt % Charge Agent | Storage Stability at 52° C | Storage Stability at 46° C | Onset of Good Fusing, °F/°C | Hot Offset, °F/°C | Fusing Latitude, °F/°C | Average Reflection Density of Fused Toner |
|---|---|---|---|---|---|---|---|---|---|---|
| 21 | 20 | 60 | 0.41 | 1.0 | Good Dry | | 250/121 300dry/ | 500/260 | 250/139 | 1.2 |
| 22 | 20 | 69 | 0.62 | 1.0 | | | 149 | 500+/260+ | 200+/111+ | 1.1 |
| 23 | 20 | 59 | 0.49 | 1.0 | | | 275/135 | 500+/260+ | 225+/125+ | 1.1 |
| 24 | | | | 1.0 | Fair | | 250/121 | 500+/260+ | 250+/139+ | |
| 25 | 22.5 | 65 | 0.40 | 1.0 | Poor | | 275/135 | 500/260 | 225/125 | 1.2 |
| 26 | 25 | 56 | 0.43 | 1.0 | Poor⁻ | Fair⊕ | 275/135 | 500/260 | 225/125 | 1.1 |
| 27 | 30 | 61 | 0.79 | 0.25 | Poor | Fair | 275/135 | 450/232 | 175/97 | 0.90 |
| 28** | 40 | 47° C | 0.67 | | Poor | Poor | 225/107 | 475/246 | 250/139 | ~1.0 |
| 29 | 46 | 46 | 0.67 | | Poor | | 225/107 | 500/260 | 275/135 | low |
| 30 | 50 | 52 | 0.65 | 0.25 | Poor | | 275/135 | 425/218 | 150/66 | 1.0 |
| 31 | 60 | 50 | 0.78 | | Poor | | 225/107 | 500/260 | 275/135 | 0.9 |
| 32 | 70 | 41 | 0.67 | | Poor | | 200/93 | 375/191 | 175/79 | 1.05 |

*Spray Dry/Fusing Evaluation/Other.
**No release agent (Dow Corning DC 200 fluid) applied to roll for this experiment.

The invention has been described in detail with particular reference to certain preferred embodiments thereof, but it will be understood that variations and modifications can be effected within the spirit and scope of the invention.

We claim:

1. A dry electrographic developer composition comprising (1) a toner comprising a polyester resin that is the condensation product of from about 30 to about 85 mole percent 2,2-dimethyl-1,3-propanediol, from 15 to about 70 mole percent 2,2'-oxydiethanol and terephthalic acid or an ester forming derivative thereof, said polyester resin having an inherent viscosity of at least about 0.30 when measured at a concentration of 0.25 g/dl at 25° C. in a 1.1 by weight mixture of phenol:chlorobenzene, and (2) a particulate carrier vehicle.

2. A composition of claim 1 wherein said polyester has a $T_g$ in the range from about 40° C. to about 80° C.

3. A composition of claim 1 comprising a dry, particulate electrographic toner which remains a free-flowing powder after incubation at 50° C. for 48 hours.

4. A composition of claim 1 wherein said inherent viscosity is from about 0.30 to about 0.85.

5. A dry, particulate electrographic developer composition comprising (1) a toner comprising a polyester resin having the following formula:

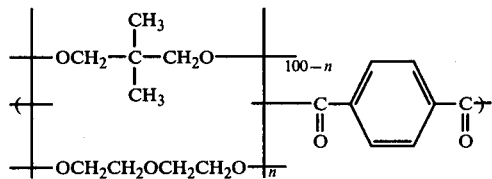

wherein n is from about 15 to about 50 and (2) ferromagnetic carrier particles

6. A composition of claim 5 wherein said polyester resin has a $T_g$ in the range from about 55° C. to about 80° C.

7. A composition of claim 5 wherein said polyester resin remains a free-flowing powder after incubation at 50° C. for 48 hours.

8. A composition of claim 5 wherein said polyester resin has an inherent viscosity from about 0.40 to about 0.70 when measured at a concentration of 0.25 g/dl at 25° C. in a 1:1 by weight mixture of phenol:chlorobenzene.

9. A dry electrographic developer composition comprising (1) a particulate toner composition having a polyester resin that is the condensation product of from about 30 to about 85 mole percent 2,2-dimethyl-1,3-propanediol, from 15 to about 70 mole percent 2,2'-oxydiethanol and terephthalic acid or an ester forming derivative thereof, said polyester resin having an inherent viscosity of at least about 0.03 when measured at a concentration of 0.25 g/dl at 25° C. in a 1:1 by weight mixture of phenol:chlorobenzene, (2) a non-blocking agent to prevent clumping or caking of toner particles during storage and (3) ferromagnetic carrier particles.

10. The composition of claim 9 wherein said polyester resin has a $T_g$ in the range from about 40° C. to about 55° C. and said non-blocking agent is polystyrene powder.

11. A dry electrographic developer composition comprising a triboelectric mixture of a particulate toner composition comprising a polyester resin having the following formula

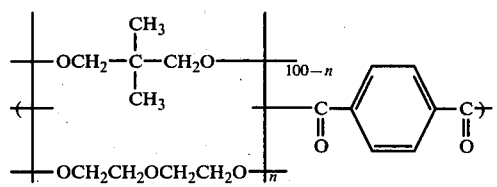

wherein n is 15 to about 70, said polyester resin having an inherent viscosity of at least about 0.30 when measured at a concentration of 0.25 g/dl at 25° C. in a 1:1 by weight mixture of phenol:chlorobenzene, and a particulate carrier vehicle.

12. A dry electrographic developer composition comprising a triboelectric mixture of (1) a particulate toner composition comprising a polyester resin having the following formula:

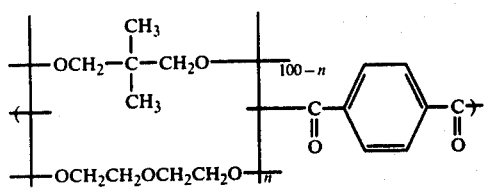

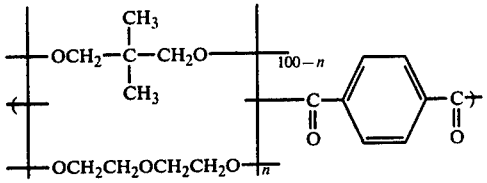

wherein n is from about 15 to about 50 and (2) resin-coated ferromagnetic carrier particles.

13. In an electrographic process wherein a visible image is formed on a substrate by depositing toner on a charge pattern thereon and the image is fixed to the substrate by fusing the toner, the improvement wherein the toner comprises a polyester resin of the formula:

wherein n is from about 15 to about 70.

14. A process of claim 13 wherein n is from about 15 to about 50 and said polyester resin has an inherent viscosity of at least about 0.30 when measured at a concentration of 0.25 g/dl at 25° C. in a 1:1 by weight mixture of phenol:chlorobenzene.

* * * * *

UNITED STATES PATENT AND TRADEMARK OFFICE
CERTIFICATE OF CORRECTION

PATENT NO. : 4,140,644
DATED : February 20, 1979
INVENTOR(S) : M. Akram Sandhu et al It is certified that error appears in the above-identified patent and that said Letters Patent are hereby corrected as shown below:

Column 12, line 37, "0.03" should read -- 0.30 --

Signed and Sealed this

Thirtieth Day of October 1979

[SEAL]

Attest:

RUTH C. MASON
Attesting Officer

LUTRELLE F. PARKER
Acting Commissioner of Patents and Trademarks